(12) United States Patent
Larsen

(10) Patent No.: US 6,246,595 B1
(45) Date of Patent: Jun. 12, 2001

(54) SERIES CONTROL OF ELECTRIC ARC FURNACES

(75) Inventor: Einar V. Larsen, Charlton, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/419,301

(22) Filed: Oct. 15, 1999

(51) Int. Cl.[7] .................. G05F 5/00; H02J 3/36; H02M 1/12
(52) U.S. Cl. .................. 363/35; 363/40; 323/209
(58) Field of Search .................. 323/207, 208, 323/209; 363/35, 34, 39, 40

(56) References Cited

U.S. PATENT DOCUMENTS

| | | | |
|---|---|---|---|
| 4,013,937 | * | 3/1977 | Pelly et al. ............... 323/207 |
| 4,047,097 | * | 9/1977 | Gyugyi et al. ............. 323/211 |
| 4,068,159 | * | 1/1978 | Gyugyi ..................... 323/211 |
| 4,529,925 | * | 7/1985 | Tanaka et al. ............. 323/207 |
| 4,857,821 | * | 8/1989 | Takeda ..................... 323/210 |
| 5,319,534 | * | 6/1994 | Brennen .................... 363/40 |
| 5,375,053 | * | 12/1994 | Jarvik et al. ............. 363/126 |
| 5,463,653 | | 10/1995 | Du Parc et al. ........... 373/108 |
| 5,610,937 | | 3/1997 | Gaupp ...................... 373/108 |
| 5,617,447 | | 4/1997 | Tambe ...................... 373/108 |
| 5,677,925 | | 10/1997 | Du Parc et al. ........... 373/104 |
| 5,808,452 | * | 9/1998 | Gyugyi et al. ............ 323/207 |
| 5,984,173 | * | 11/1999 | Edwards .................... 323/207 |

* cited by examiner

Primary Examiner—Peter S. Wong
Assistant Examiner—Bao Q. Vu
(74) Attorney, Agent, or Firm—Carl B. Horton; Thomas M. Blasey; Hunton & Williams

(57) ABSTRACT

A circuit and method for regulating power supplied on a network which provides power to an electric arc furnace or other highly variable load. The circuit includes at least a first inverter connected in series with the arc furnace transformer, and in shunt with the power supply. The circuit and method provide an effective, low cost technique for controlling network power.

28 Claims, 4 Drawing Sheets

SERIES CONTROL OF ELECTRIC ARC FURNACES

BACKGROUND OF THE INVENTION

The present invention relates generally to power control. More particular, the resent invention relates to providing a controlled AC voltage to randomly-fluctuating loads such as electric arc furnaces.

Electric arc furnaces (EAFs) are widely used in a variety of applications, including the melting of scrap metal. EAFs represent erratic nonlinear loads to their associated power networks. This is because the arc is random and fluctuating in nature due to the unevenness of the material surface and the mechanical vibrations of the arc electrode assembly. EAFs can adversely affect power quality through, for example, poor power factor, harmonics, and "flicker".

Flicker occurs in the power network as a result of a rapidly changing system voltage, mainly during the melting of scrap metal in the electric arc furnace. When scrap is provided to the furnace, arcs between the furnace electrodes and the scrap melt the metal. The molten metal drips to the bottom of the furnace, and the arcs shift to other pieces of scrap metal. The shifting of the arcs results in highly variable and reactive power consumption. Further, short circuits can result from pieces of scrap falling onto the electrodes, thus shortening the arcs and causing the furnace electrode control system to reignite the arc. It should be apparent from this description that an electric arc furnace consumes a widely and rapidly fluctuating amount of supply current and voltage, thus causing flicker and inefficiencies in the power network. As the power ratings of EAFs have increased, these problems have increased in intensity.

Accordingly, it is generally desirable to stabilize arc currents in a manner which minimizes disruption to the electric power supply grid. It is also generally desirable to provide steady-state regulation of the arc current, and to improve power efficiency.

One method of controlling the arc current is shown in FIG. 1, where power is supplied to an EAF 10 from a supply 12 through a main transformer 14 having no-load taps on the load side, and a tap-changer. EAF current can be controlled in this arrangement by temporarily suspending the operation of the furnace, and adjusting taps on the supply transformer 14 to alter the voltage applied to the electrodes of the arc furnace 10. For example, a melt cycle begins on one tap, and at the end of the melt cycle the process is interrupted while the tap is moved to a more optimal location to complete the melting process.

FIG. 1 also includes a Static VAR Compensator (SVC) 16, which can be used to reduce the side effects of the randomly fluctuating nature of the arc load. SVCs involve shunt compensation on the electric supply to the EAF. The SVC is separate from the EAF, and is usually in a physically remote location. Typically, SVCs are rated significantly higher than the EAF load- SVCs can be up to 5 times the rating of the load (e.g., 250 MVAr SVC may be required for a 50 MW electric arc furnace).

A direct current (DC) EAF is shown in FIG. 2. The DC arrangement includes power electronics, in the form of a controlled thryistor bridge 18 rated for the full power of the load 10. This arrangement supplies the load with a controlled direct current, which can be regulated while the load DC voltage varies based on the arc condition. This DC arrangement provides relatively limited control, and a SVC (not shown) may also be required. Further, additional converters may be necessary to reduce the fluctuations of the reactive current on the power supply. Practical installations typically use at least two converters, with separate transformer windings, to achieve 12-pulse operation.

Another solution is shown in FIG. 3, where a controlled series reactor 20 is provided between the electric supply and the furnace transformer. The series reactor 20 has a controlled thryistor portion on the high voltage side of the transformer. The series reactor 20 is physically relatively large, and has a rating substantially equal to the load. The thyristors regulate the effective reactance imposed in series with the load to partially mitigate the fluctuations of the load current. This arrangement has relatively limited compensation ability, due to the load fluctuation caused by changes in the real part of the impedance. The series reactor can affect only the imaginary portion of the impedance. Again, this arrangement may also require a SVC (not shown) to provide improved regulation.

U.S. Pat. No. 5,617,447 discloses a method of stabilizing a power supply network against reactive load fluctuations, and a reactive power compensation device for a DC arc furnace. Inductors are used to provide reactive compensation. The disclosed technique features a relatively complex arrangement of multiple control loops, and multiplication of power control element outputs.

U.S. Pat. No. 5,610,937 discloses a method for regulating a DC arc furnace. To reduce flicker, comparatively fast reactive power regulation is mathematically superimposed on the relatively slow current regulation of the DC arc furnace.

U.S. Pat. Nos. 5,463,653 and 5,677,925 disclose a power converter device for DC power supply to an electric arc furnace. The power converter device includes at least one transformer in which the secondary winding applies a three-phase current to a rectifier circuit. The rectifier circuit is a non-reversible "freewheel" circuit, and includes controlled semiconductors for each secondary winding.

While the techniques described above provide voltage regulation, none provide sufficiently simple, effective, and low cost solutions to the problem of voltage regulation in a power grid which supplies power to an electric arc furnace.

In view of the above discussion, it would be desirable to provide a relatively simple, effective, reliable, and low cost voltage control capability for an electric arc furnace or other similar load on a power system.

BRIEF SUMMARY OF THE INVENTION

The present invention overcomes the above-noted problems, and achieves additional advantages, by providing for a novel technique for regulating voltage provided to an AC electric arc furnace. According to exemplary embodiments, at least one inverter can be connected in shunt with the power supply and another at least one inverter can be connected in series with the EAF to modulate the AC voltage. The rating of the inverters can be less than the rating of the EAF, thereby achieving a significant cost advantage over DC EAF technology.

The inverter can be implemented by back-to-back inverters, for example by connecting a source inverter in shunt with the power supply network in addition to a series-connected inverter. The shunt-connected source inverter allows power transfer in either direction from the series-connected inverter to allow steady-state regulation of the arc voltage. The shunt-connected source inverter further can provide shunt reactive control to minimize fluctuations of the furnace and other loads. The inverters, under microprocessor control, effectively vary the impedance seen by the power supply source to regulate the erratic nature of the arc furnace load.

Thus, the present invention provides a simple but effective technique for providing a controlled AC voltage to an AC electric arc furnace.

BRIEF DESCRIPTION OF THE DRAWINGS

The features and advantages of the present invention can be understood more fully by reading the following Detailed Description in conjunction with the accompanying drawings, in which.

DETAILED DESCRIPTION OF THE INVENTION

Figure 1:
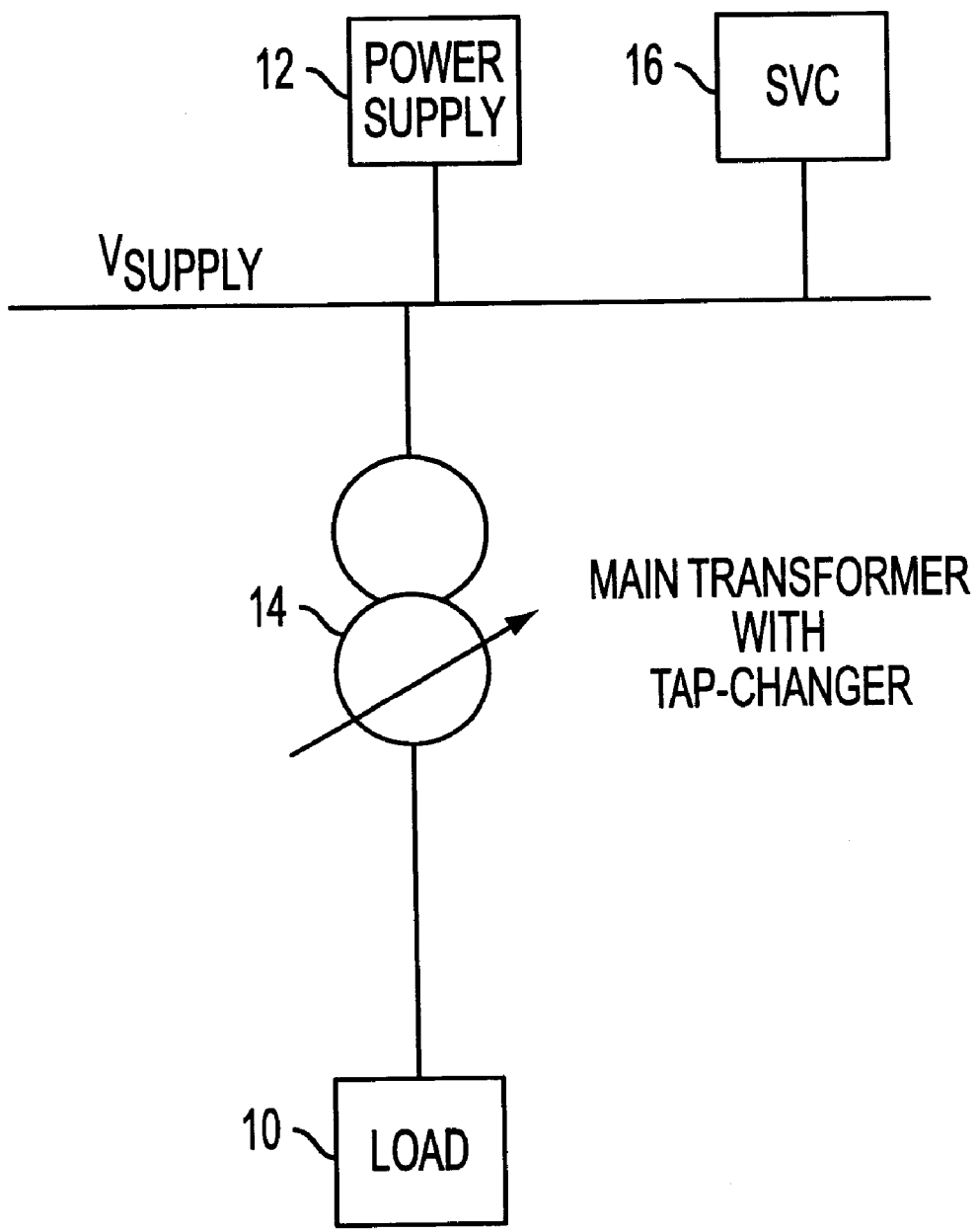
FIG. 1 is a block diagram of a conventional arrangement for providing EAF control using a SVC.
Figure 2:
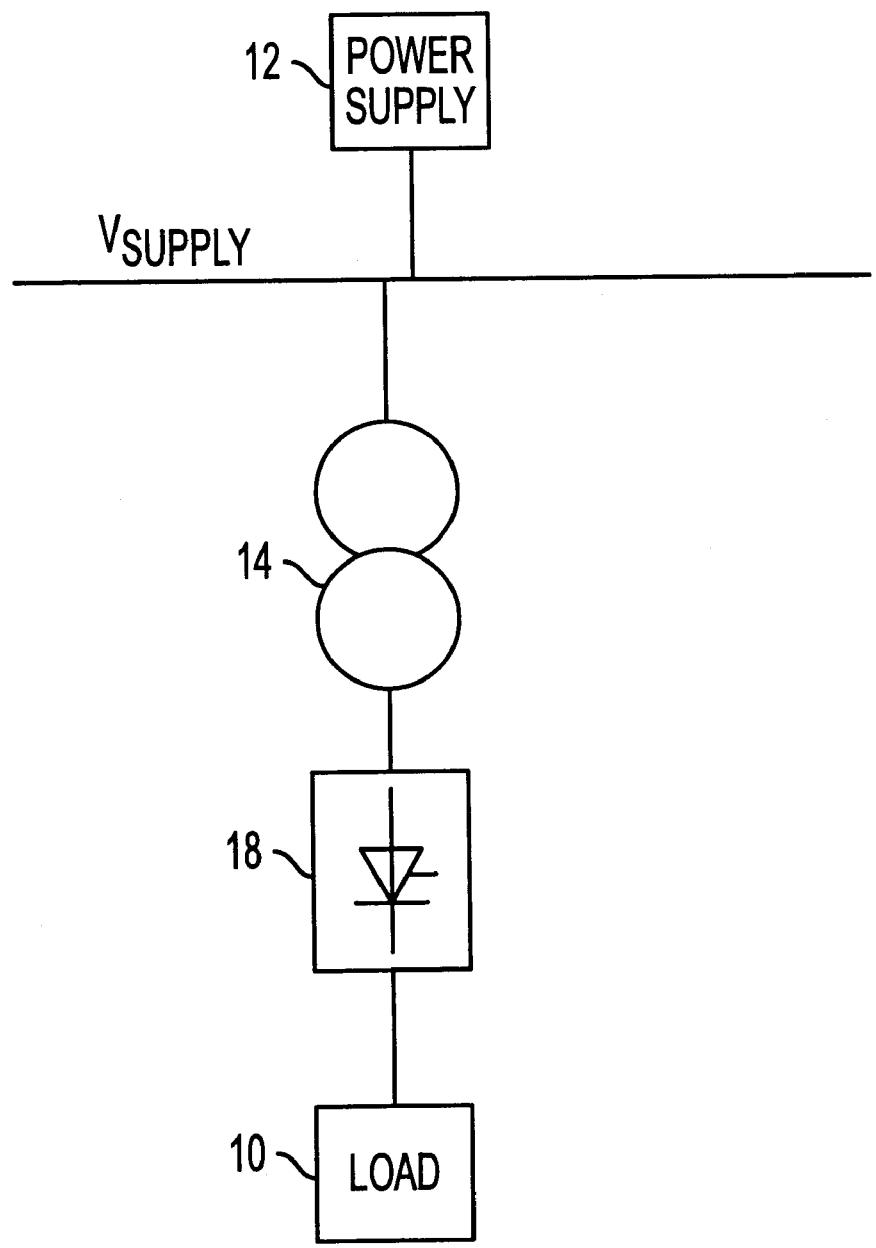
FIG. 2 is a block diagram of a second conventional control technique using a DC arrangement.
Figure 3:
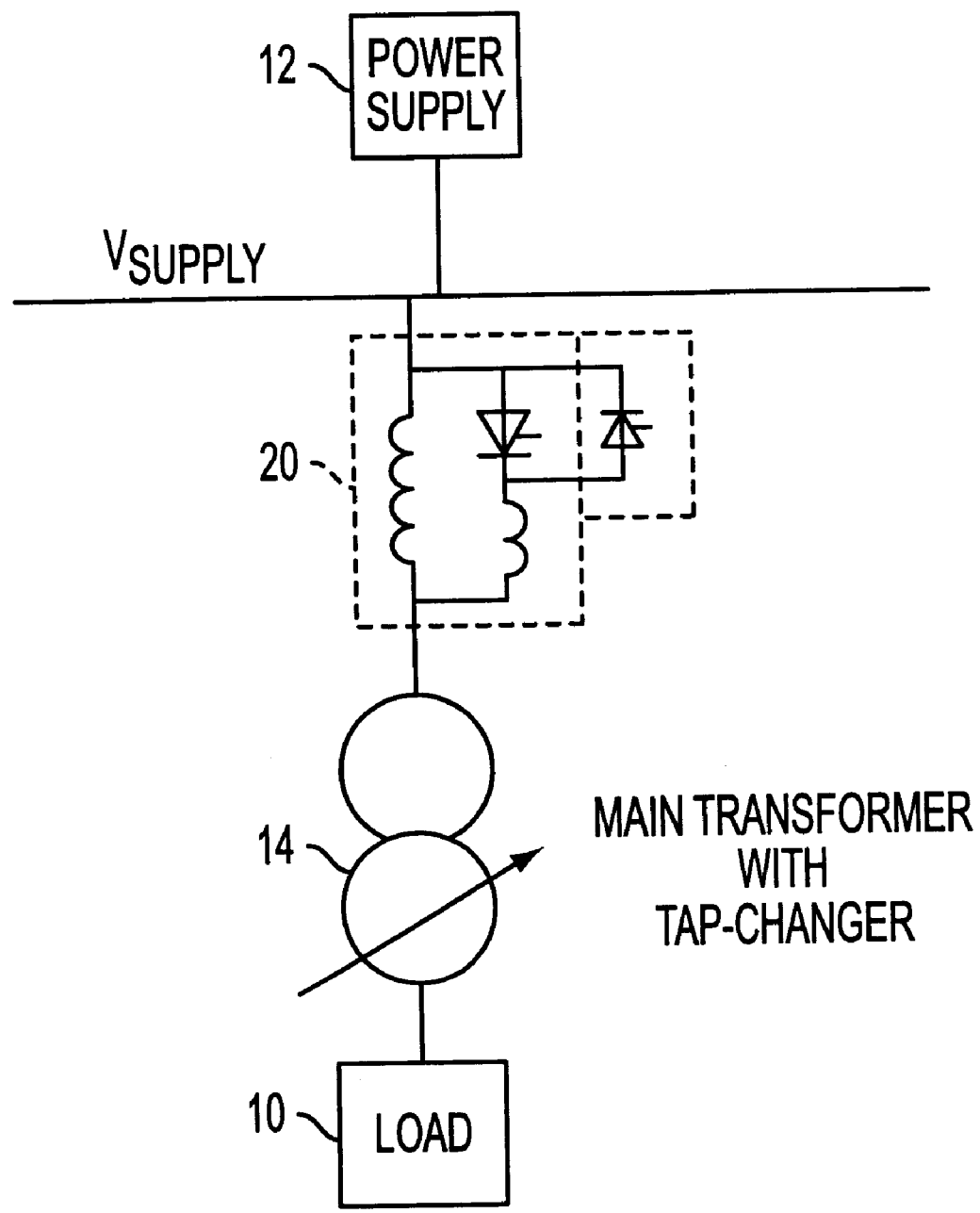
FIG. 3 is a block diagram showing a third conventional control technique using a series reactor.
Figure 4:
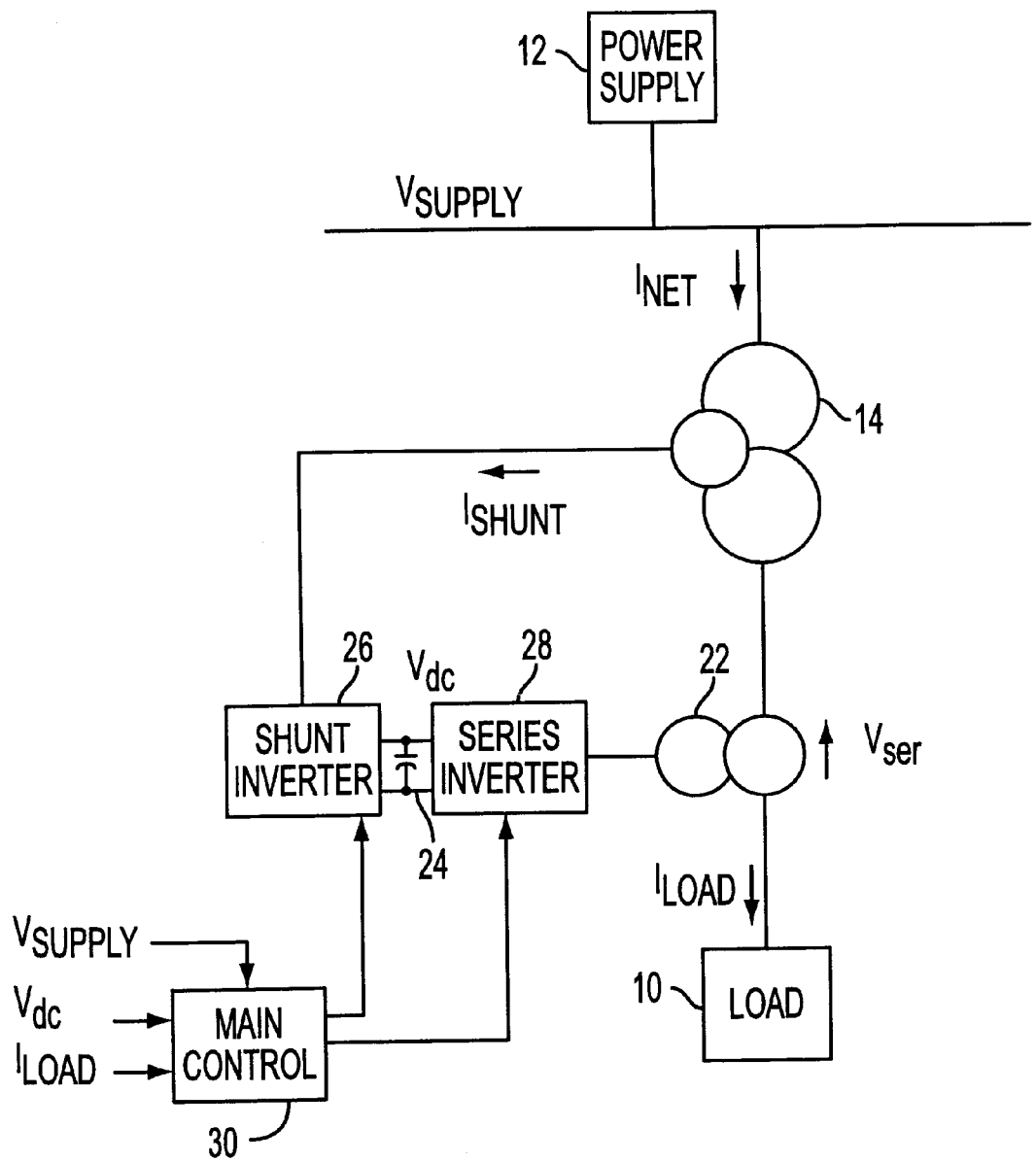
FIG. 4 is a block diagram of one implementation of the present invention.

FIG. 4 is a block diagram of a presently preferred embodiment of the present invention. In this embodiment, inverter 28 is connected in series between the furnace load 10 and the power supply 12 via series transformer 22 and main transformer 14. Using this approach, the electrical rating of the components can be less than the full rating of the furnace, thus resulting in a significant cost advantage over prior systems.

In the embodiment of FIG. 4, the electric arc furnace 10 has an associated furnace transformer 14 which receives a current Inet from a power supply 12 through a voltage supply network Vsupply. A series transformer 22 is connected in series between the furnace transformer 14 and the load 10. A DC link 24 is provided between a first (shunt) inverter 26 and a second (series) inverter 28. The first inverter 26 is connected in shunt with the power supply 12 via a tertiary winding on main transformer 14, and receives a current I shunt from the transformer 14. Further, a microprocessor-based controller 30 is provided which receives a supply voltage, the DC voltage across the DC link 24, and the load current Iload. Based on these inputs, the controller 30 outputs control signals to the inverters 26 and 28. Alternatively, the control inputs can be synthesized from other measurements- for example, using preexisting voltage and current sensors on the series and shunt inverters rather than sensors on the main load or power system points.

In operation, the shunt inverter 26 permits real power to be transferred in either direction- that is, to or from the series connected inverter 28. This action of the shunt inverter allows for steady-state regulation of the arc voltage, eliminating the need for tap changing. Further, the shunt inverter 26 provides shunt reactive control to minimize fluctuations due to the operation of the furnace or other loads connected to the power supply network. It will be appreciated that the series connected inverter 28 provides most of the regulation function, and that the shunt inverter 26 provides shunt compensation for the fluctuations not fully compensated by the series-connected inverter 22.

As presently contemplated, the shunt inverter 26 is supplied via a tertiary connection to the main transformer 10. Alternatively, the shunt inverter 26 can be supplied from a separate transformer (not shown), or other suitable source.

The microprocessor-based controller 30 is programmed to cause the series inverter 28 to regulate the active power portion of the AC current to maintain an operator setpoint for average value. The microprocessor 30 is further programmed to minimize AC current fluctuations within a predetermined bandwidth (e.g., up to approximately 20 Hz) to avoid irritation of other customers on the power supply network. This type of control can be achieved using known inverter current regulation techniques. The control logic may also incorporate features which increase the damping of mechanical vibrations in the electrode assembly by modulating the effective impedance, using modulation techniques known to those skilled in the art of control design for electromechanical systems.

The shunt inverter 26 can similarly be controlled to regulate the voltage across the DC link 24, and to regulate (e.g., by injecting or absorbing) AC reactive current to minimize fluctuations of the AC supply voltage. In this way, the shunt inverter effectively compensates for variations beyond the control range of the series inverter 28. The control of the shunt inverter 26 can be implemented in a manner similar to that used in connection with enhanced regenerative AC motor drives.

The series voltage Vser across the series transformer is controlled to regulate the effective impedance seen by the power supply network, and can compensate the real portion of the arc impedance variation to stabilize the effect of the arc furnace on the power supply network. Since the arrangement of FIG. 4 can operate in a buck or boost mode, the effectiveness can be twice the rating of the components (e.g., a 25% series inverter rating can provide 50% total voltage variation).

The arrangement of FIG. 4 provides unique advantages over known DC control techniques. For example, the arrangement of FIG. 4 achieves performance substantially equivalent to DC control techniques using lower-rated components. Further, the arrangement of FIG. 4 can compensate directly for variations in the real portion of the load impedance without substantially affecting the power supply network. In addition, the arrangement of FIG. 4 allows for a simpler main transformer 14.

As stated above, one significant advantage of the arrangement of FIG. 4 is that series voltage injection via the series inverter and series transformer is achieved using components rated significantly less than the total load (e.g., approximately 0–25% of the load represented by the arc furnace). The shunt current injection is rated less than the total load (e.g., substantially the same as, or slightly higher than, the series voltage injection). It should be appreciated that while the embodiment of FIG. 4 shows the use of a series transformer 22 to couple the inverter between the furnace transformer 14 and load 10, the series transformer can be eliminated, and the inverters can be connected directly to the neutral of the transformer windings. This alternative embodiment would further reduce cost. It is clear that in such an embodiment, the series inverter current rating would match the current rating of the series-connected equipment.

Another alternate embodiment would include elimination of the shunt inverter 26. The shunt inverter 26 can be replaced by a thyristor bridge connected across the DC link 24 to regulate real power. This alternative would not provide direct compensation of the real portion of the load impedance, but would offer reduced cost.

It should also be appreciated that the embodiment of FIG. 4 contemplates that the shunt inverter 26 is implemented in a self-commutated manner. The shunt inverter 26 may also be implemented in a line-commutated manner to further reduce cost, allowing the series inverter 28 to compensate for the real portion of the load impedance but losing the ability to independently provide shunt reactive compensation.

Still another alternate embodiment would involve a very large capacity energy storage element across the DC link. Such an embodiment could be implemented using DC capacitors or batteries.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A method for providing a controlled AC voltage to a fluctuating load, comprising the steps of:
   providing a first AC voltage via a main transformer, the main transformer being connected in series with a series transformer;
   providing a first inverter connected in series between the main transformer and the fluctuating load, the first inverter connected to a second inverter via a DC link;
   generating control signals in a programmed microprocessor, based on signal inputs indicative of one or more of:
   a supply voltage,
   a DC voltage across the DC link, and
   a load current; and,
   providing the control signals to the first inverter and the second inverter based upon the signal inputs; wherein the first inverter is controlled to regulate an overall impedance presented to the main transformer.

2. The method of claim 1, wherein the fluctuating load is an alternating current (AC) electric arc furnace.

3. The method of claim 1, wherein the DC link of the first inverter is supported by the second inverter connected in shunt with the main transformer.

4. The method of claim 2, wherein the first inverter has a capacity rating which is less than a capacity rating of the electric arc furnace.

5. The method of claim 3, wherein the first inverter is connected directly to a neutral of a supply-side winding of the series transformer.

6. The method of claim 3, further comprising the steps of providing bidirectional transfer of real power through the second inverter, and providing reactive compensation to a power system supplied by the main transformer.

7. The method of claim 1, wherein the first inverter, under the microprocessor control, regulates an active power portion of AC current to maintain an approximate average value.

8. The method of claim 1, wherein the first inverter, under the microprocessor control, regulates AC current drawn from the main transformer within a bandwidth of approximately 20 Hz to the value requested by the operator.

9. The method of claim 1, further comprising the step of providing control logic to dampen mechanical vibrations by modulating the impedance.

10. A circuit for regulating power in a power system having an erratic load which is supplied from a power supply, comprising:
    a main transformer which receives electric current from the power supply (12);
    a series transformer connected in series with the main transformer;
    a first inverter connected in series with the power supply to regulate an effective impedance of the load;
    a second inverter connected, via the main transformer, in shunt to the power supply to regulate a DC link of the first inverter; and
    a microprocessor based controller, which receives signal inputs indicative of one or more of:
    a supply voltage,
    a DC voltage across the DC link, and
    a load current; and,
    based, at least in part, upon the signal inputs, the microprocessor based controller outputs control signals to the first inverter and the second inverter;
    wherein the microprocessor based controller is programmed to
    enable the regulation of an active power portion of the electric current to maintain an operator set-point for average value and,
    to minimize the electric current fluctuations within a predetermined bandwidth.

11. The circuit of claim 10, wherein the second inverter includes a bidirectional thyristor bridge.

12. The circuit of claim 10, wherein the second inverter regulates reactive power drawn from the source independently from regulating voltage on the DC link.

13. The circuit of claim 10, wherein the load is an electric arc furnace.

14. The circuit of claim 10, wherein the DC link includes one or more DC capacitors.

15. The circuit of claim 10, wherein the DC link includes a battery.

16. The circuit of claim 10, wherein the first inverter is connected directly to a neutral winding of the main transformer.

17. The circuit of claim 10, wherein a capacity rating of each of the first and second inverters is less that a load capacity rating.

18. The circuit of claim 10, wherein the microprocessor based controller further comprises control logic connected to the first inverter, the control logic functioning to dampen mechanical vibration.

19. A method for regulating an AC voltage provided from a power supply to a fluctuating load, comprising the steps of:
    providing a main transformer which receives electric current from the power supply;
    providing a series transformer connected in series with the main transformer;
    providing at least a first inverter connected in series with the power supply;
    providing at least a second inverter connected, via main transformer, in shunt with the power supply; and
    providing a control circuit, which receives signal inputs indicative of one or more of:
    a supply voltage,
    a DC voltage across the DC link, and
    a load current; and,
    providing control signals from the control circuit to at least the first inverter and the second inverter to control the first and second inverters to regulate an overall impedance presented to the power supply.

20. The method of claim 19, wherein the fluctuating load is an AC electric arc furnace.

21. The method of claim 19, wherein the first inverter has a capacity rating which is less than a capacity rating of the fluctuating load.

22. The method of claim 19, further comprising the step of controlling the first and second inverters to provide a bidirectional transfer of real power through the second inverter, and to provide reactive compensation to a power system supplied by the power supply.

23. The method of claim 19, further comprising the step of providing control logic to dampen mechanical vibrations by modulating the overall impedance.

24. A circuit for regulating an AC voltage provided from a power supply to a fluctuating load, comprising:
- a main transformer which receives electric current from the power supply;
- a series transformer connected in series with the main transformer;
- a first inverter connected in series with the power supply;
- a second inverter connected, via main transformer, in shunt with the power supply, and connected to regulate a DC link of the first inverter; and
- a control circuit connected to the first and second inverters, which receives signal inputs indicative of one or more of:
    - a supply voltage,
    - a DC voltage across the DC link, and
    - a load current; and,
- based, at least in part, upon the signal inputs, the control circuit outputs control signals to the first inverter and the second inverter;
- wherein the control circuit controls the first and second inverters to regulate an overall impedance presented to the power supply.

25. The circuit of claim 24, wherein the control circuit further controls the first and second inverters to provide a bidirectional transfer of real power through the second inverter, and to provide reactive compensation to a power system supplied by the power supply.

26. The circuit of claim 24, wherein the control circuit includes control logic to dampen mechanical vibrations by modulating the overall impedance.

27. The circuit of claim 24, wherein the fluctuating load is an AC electric arc furnace.

28. The circuit of claim 24, wherein the capacity rating of the first and second inverters is lower than a capacity rating of the fluctuating load.

* * * * *